Feb. 25, 1941.　　　B. F. WADDELL　　　2,233,117
REGULATOR
Filed June 23, 1938　　　3 Sheets-Sheet 1

INVENTOR
Benson F. Waddell
BY
Pennie Davis Marvin & Edmonds
ATTORNEYS

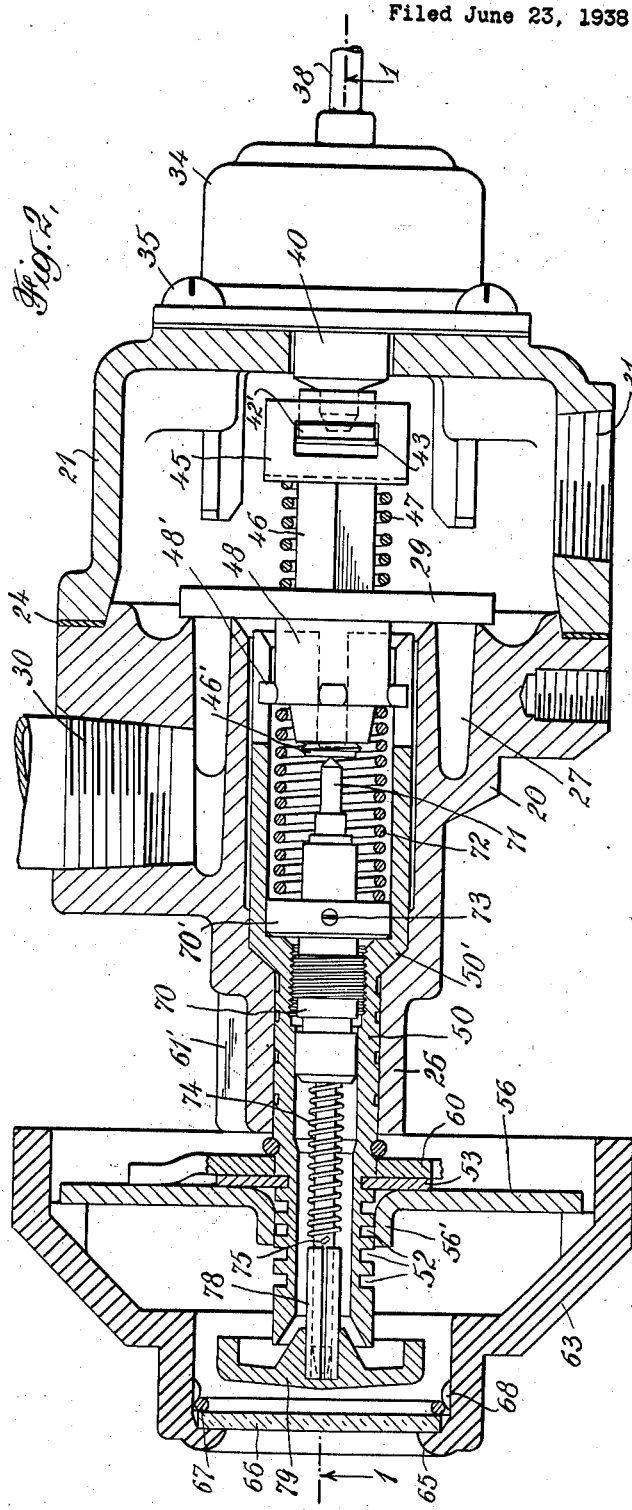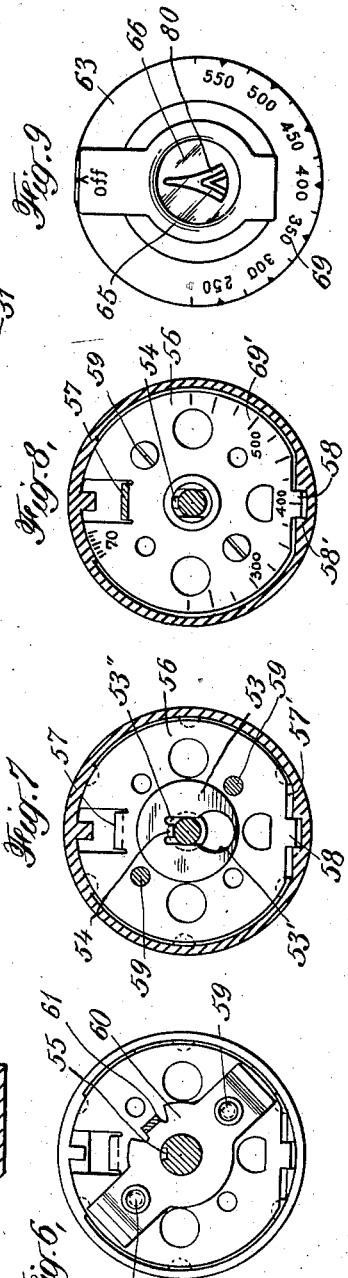

Feb. 25, 1941. B. F. WADDELL 2,233,117
REGULATOR
Filed June 23, 1938 3 Sheets-Sheet 3
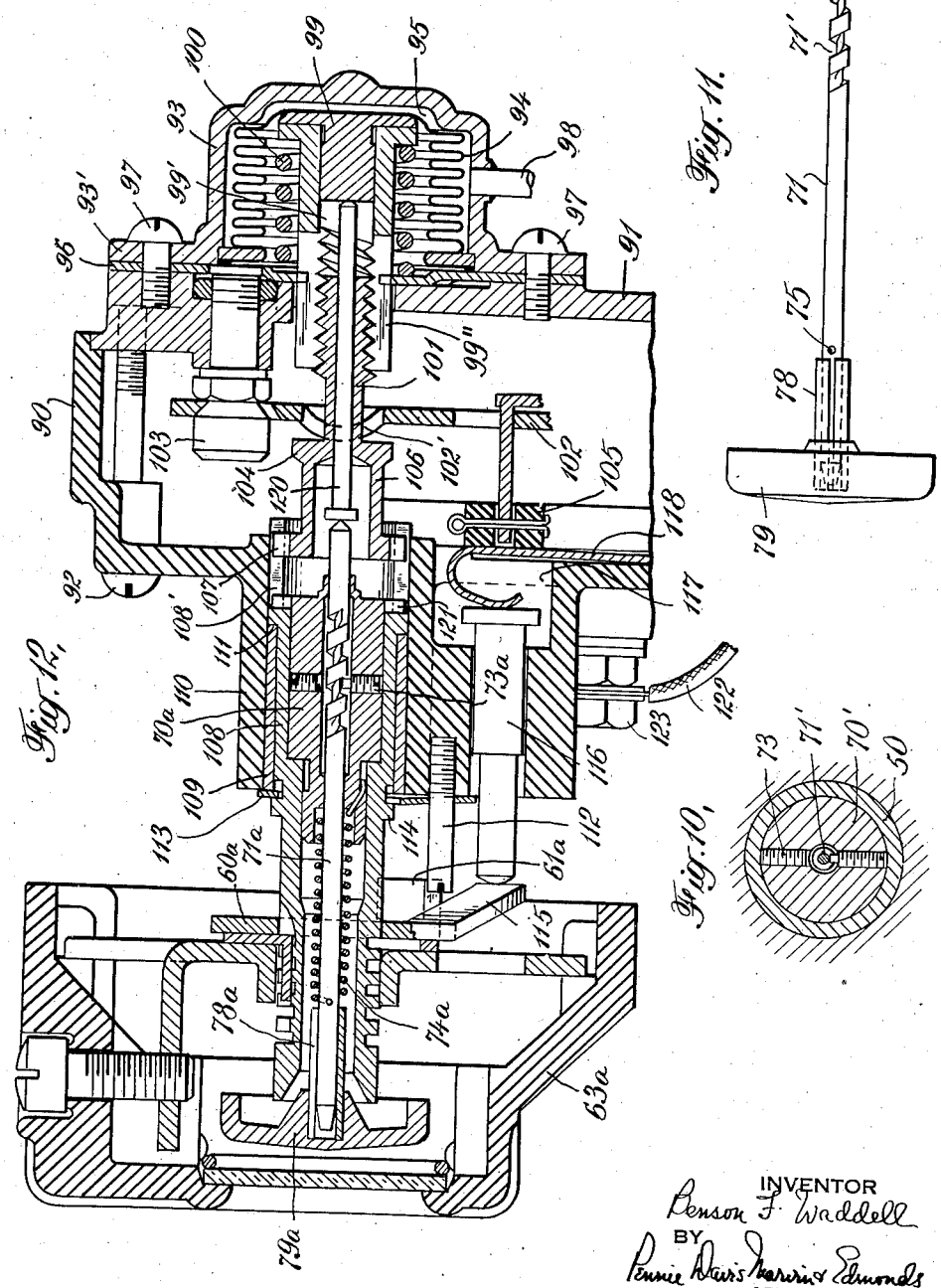
INVENTOR
Benson F. Waddell
BY
Pennie Davis Marvin & Edmonds
ATTORNEYS Patented Feb. 25, 1941

2,233,117

UNITED STATES PATENT OFFICE 2,233,117

REGULATOR

Benson F. Waddell, Jackson Heights, N. Y., assignor to The Wilcolator Company, Newark, N. J., a corporation of Delaware Application June 23, 1938, Serial No. 215,347

16 Claims. (Cl. 236—94)

This invention relates to regulators for controlling the temperature in ovens, refrigerators, and similar appliances, and has particular reference to a novel regulator of this type which is operable automatically by thermo-responsive means to maintain a predetermined temperature in the appliance, and which may be adjusted to different temperature settings corresponding to the temperature which it is desired to maintain. The new regulator is of compact construction and is accurate and reliable in operation.

For illustrative purposes, the invention will be described and illustrated in connection with an oven, although it is to be understood that it may be employed for regulating the temperature in other appliances as well.

It has been proposed heretofore to provide oven regulators with a pointer for indicating when the oven has reached a certain temperature. One such regulator which has long been in use comprises a valve operable by a thermostat in the oven, and a dial movable to different temperature settings for adjusting the valve. The pointer cooperates with a permanently fixed index and may be moved relative thereto by both the dial and the thermostat. When the oven is to be heated, the dial is set to the desired temperature and through its connection with the pointer causes the pointer to move to one side of the index, the "low" side, indicating that the oven is below the temperature for which the dial is set. As the temperature in the oven rises, the thermostat moves the pointer back toward its initial position under the index and moves the valve toward its seat, and when the oven is at the temperature for which the dial is set, the valve is in its throttling position and the pointer is under the index, indicating that the desired temperature has been reached. If the oven temperature should continue to increase or "overshoot," the thermostat moves the valve closer to the seat and moves the pointer to the opposite side of the index, the "high" side, thus showing that the oven temperature is above that for which the dial is set. If the dial is set from a high to a low temperature, the pointer moves to the "high" side of the index to indicate that the oven is too hot, and as the oven cools to the lower temperature, the thermostat moves the pointer back toward its index, indicating that the lower temperature is being approached.

While regulators of this type indicate when the temperature of the oven corresponds to that for which the dial is set, they do not indicate the actual temperature of the oven when the pointer is out of registry with the index. That is, when the pointer is displaced from the index, it indicates only whether the oven temperature is above or below that for which the dial is set. Also, these regulators as devised heretofore are generally cumbersome and bulky by reason of the indicating means.

One feature of the present invention, therefore, resides in the provision of a novel temperature regulator of compact construction including an indicator which performs the dual function of showing the relation between the oven temperature and that for which the dial is set, and of indicating the actual temperatures in the oven as the heating and cooling progresses. A regulator made in accordance with my invention comprises a valve or other means for controlling the supply of a heating medium to the oven, and an element responsive to temperature changes in the oven for automatically regulating the control means to maintain the desired temperature. The temperature to be maintained in the oven may be selected by a handle for adjusting the control means, the handle being movable to different temperature settings determined by an index cooperating with a scale of temperature graduations. The indicating means preferably comprises a pointer operatively connected to the thermo-responsive element and movable thereby relative to the index to indicate whether the oven temperature is higher or lower than that for which the handle is set, the pointer being also movable by the thermo-responsive element over the scale of gradations to indicate thereon the different oven temperatures.

In the preferred construction, the adjustment handle is in the form of a dial having the scale of temperature graduations thereon which cooperates with a fixed index, and the pointer is connected to the dial as well as to the thermo-responsive element, so that the pointer moves with the dial and scale. The connection between the pointer and thermo-responsive element is such that it is not affected by movement of the pointer with the dial and scale, and accordingly the pointer indicates the oven temperature on the scale regardless of the setting of the dial. The parts may be so arranged that when the oven is at room temperature and the dial in its "off" position, the thermo-responsive element maintains the pointer in a vertical position pointing upwardly to the "off" position on the scale under the index, indicating that the oven is not in use.

In setting the regulator to start the oven, the dial is turned until the temperature graduation on the scale corresponding to the desired oven temperature is opposite the fixed index, whereby the control means is set to the proper position. As the dial is turned, the scale and pointer turn with it so that the pointer continues to point to its initial or "off" position on the scale but moves to one side of the index, indicating that the oven temperature is too low. As the oven commences to heat, the thermo-responsive means moves the pointer along the dial scale back toward its initial position under the index, the pointer indicating in its travel along the scale the actual temperatures in the oven as the heating progresses. When the oven attains the desired temperature, the pointer arrives back to its initial position under the index and points to that temperature on the scale for which the dial is set. If the oven temperature should thereafter continue to increase or "overshoot," the thermo-responsive means moves the pointer further along the dial scale to the other side of the index, whereby the pointer indicates that the oven temperature is too high and also indicates in actual degrees on the scale the extent to which the temperature is too high. Any further adjustment of the dial causes the pointer to move with the scale and dial without affecting the connection between the pointer and the thermo-responsive means, so that the pointer continues to indicate on the scale the temperature in the oven.

Another feature of the invention resides in the provision of a temperature regulator for gas ovens or the like which includes a novel valve assembly. Temperature regulators for gas ovens generally include a casing having gas inlet and outlet ports and a valve in the casing between the ports. In one type of gas regulator, the valve is disposed intermediate the ends of the casing, and the valve member is connected to a thermo-responsive element at the rear end of the casing by a rod extending through an opening in the valve member and movable therein to accommodate "overshoot." In regulators of this type as devised heretofore, the valve is generally closed by seating of the valve member on the rim of a central opening in the casing forming a gas passage between the inlet and outlet ports, the passage in some instances also serving to accommodate a valve adjustment shaft which extends through the gas passage from a temperature adjustment handle at the front end of the casing. With this construction, the opening in the valve member through which the connection from the thermo-responsive element extends must be sealed to prevent the passage of gas to the burner when the valve is closed, and the provision of adequate sealing means involves an appreciable item of expense.

In the preferred form of my new gas regulator, the valve, temperature adjustment handle and thermo-responsive element are arranged in straight line relation, with the handle and thermo-responsive element at the opposite ends of the casing and the valve intermediate the ends. The thermo-responsive element is connected to the valve by a rod extending through a central opening in the valve member and slidable therein to accommodate overshoot, and the connection is adjustable by a shaft extending from the adjustment handle through a passage in the casing which leads to the opening in the valve member. However, this passage is separate from the gas passage in the valve seat, the latter passage being offset laterally from the first passage. Preferably, the gas passage surrounds the first passage and is separated therefrom by an annular part of the casing, and when the valve is closed, the valve member seats against the annular part and closes the end of the gas passage from the corresponding end of the first passage and the opening in the valve member. Accordingly, when the valve member is seated, the passage of gas between the inlet and outlet ports is prevented, irrespective of the fit between the valve member and the connection extending therethrough.

Still another feature of the invention resides in the provision of a bimetallic member of novel construction which may be used as a thermo-responsive element, such as a compensator, in a temperature regulator. Bimetal has long been used in thermo-responsive devices as an actuating element, but as commonly made heretofore it is in the form of a substantially flat sheet which bows in response to temperature changes. I have found that such a sheet is resistant to thermostatic bowing due to the fact that temperature changes cause it to bow both longitudinally and transversely, and when the sheet bows slightly in a transverse direction it strongly resists bowing in a longitudinal direction. Accordingly, the work obtainable from the bimetal is limited by the transverse bowing thereof. In the bimetallic element of the present invention, this resistance to thermostatic bowing is substantially eliminated by forming the sheet with transverse corrugations. With this construction, the corrugations resist transverse bowing of the sheet without resisting longitudinal bowing thereof, and since the sheet is maintained substantially straight in a transverse direction at all times, the longitudinal bowing is unretarded. Accordingly, the movement obtainable from the bimetal in response to a given temperature change is substantially greater than in prior bimetallic elements of the same size.

These and other features of the invention may be better understood by reference to the accompanying drawings, in which—

Fig. 1 is a longitudinal section through one form of the new regulator adapted for use with gas ovens;

Fig. 2 is a section on the line 2—2 of Fig. 1;

Figs. 3 to 8, inclusive, are reduced sections on the lines 3—3 to 8—8, respectively, in Fig. 1;

Fig. 9 is a reduced front view of the dial shown in Figs. 1 and 2;

Fig. 10 is a section on the line 10—10 in Fig. 1;

Fig. 11 is a detail view of part of the temperature indicating means shown in Figs. 1 and 2, and Fig. 12 is a section through part of another form of the new regulator adapted for use with electric ovens.

Referring to Figs. 1 to 11 of the drawings, the device there shown comprises a casing made up of a front section 20 and a hollow body 21 secured thereto by bolts 22 (Fig. 4) to form a main chamber 23. Preferably, packing 24 is interposed between the section 20 and body 21 to make the chamber 23 gas-tight. A central passage 25 extends forwardly from chamber 23 through the casing and through a hollow boss 26 formed at the front end of section 20. Surrounding the inner end of passage 25 is an annular passage 27 formed in the section 20 and communicating with chamber 23. The passage 27 terminates in a double seat make up of an inner annular portion 28 and an outer annular portion 28', and cooperating with the double seat 28—28' is a valve member 29. The body 21 is formed with an inlet port 30 for admitting gas to the annular passage 27, and the valve member 29 and seat 28—28' together form a control means for regulating the flow of gas from passage 27 to the chamber 23 and to an outlet port 31 in section 20, the port 31 being adapted for connection to an oven burner (not shown).

The valve member 29 is movable by thermoresponsive means which may take various forms but preferably comprises a bellows 33 sealed within a cup 34 connected to the rear end of the casing by bolts 35, the bellows and cup together forming expansible and contractible chamber 36. The open end of the cup 34 is sealed to the casing by an annulus 37 interposed between the rear end of the casing and a flange 34' on the cup. At its rear end, the cup 34 has an opening in which the end of a capillary tube 38 is sealed, the tube leading from the chamber 36 to a bulb (not shown) adapted to be located in the oven. The bulb, tube and chamber 36 are filled with a thermo-responsive liquid, such as chlorinated diphenol. A headed pin 40 has its head seated against the end of the bellows and extends forwardly into chamber 23 through the annulus 37 and a central opening in the rear end of the casing, the front end of the pin being reduced. A spring 40' coiled around pin 40 bears at one end against the rear end of the casing and at the opposite end against the head of the pin and tends to expand the bellows and compress the liquid in chamber 36.

A metal strap 42 in chamber 23 is formed with a central opening through which the reduced end 41 of pin 40 extends, the strap being normally seated against a shoulder 41' on the pin formed by the reduced end. The ends of strap 42 are inclined forwardly relative to the central portion thereof and are reduced in width at their extremities to form lugs 42' (Fig. 5). A strip of bimetal 43 is disposed in front of strap 42 and is seated against the inclined ends of the strap, the bimetal being preferably formed with transverse corrugations 43' (Fig. 1). At its ends the strip 43 is formed with lugs 44 similar to the lugs 42' and the lugs 42' and 44 extend through openings in the legs of a U-shaped retainer 45 made of spring metal. The ends of the retainer are bent backwardly and its intermediate portion has an opening through which a square, headed rod 46 extends, the head of the rod engaging the rear face of retainer 45 and normally bearing against the central corrugation of bimetallic strip 43. The rod extends forwardly through a central opening in valve member 29 and is formed at its front end with a reduced, threaded portion 46'. The rod 46 fits relatively loosely in the central opening in the valve member, and the edges of the opening are rounded so that the valve member may adjust itself on the rod to properly seat on the valve seat 28—28'. Coiled around the rod 46 is a spring 47 which bears at one end against the retainer 45 and at the opposite end against valve member 29. An adjustment nut 48 threaded on the reduced end of the rod normally engages the front face of valve member 29 and may be screwed on the rod to adjust the valve member.

The nut 48 may be adjusted on rod 46 by manual adjustment means comprising a hollow shaft 50 extending through the passage 25 in the casing and the hollow boss 26. The shaft 50 is formed with a shoulder 50' which normally engages a co-acting shoulder in passage 25, thereby determining the axial position of the shaft in the casing. At its rear end, shaft 50 is formed with longitudinal slots 51 into which a plurality of radial lugs 48' on the adjustment nut 48 extend. Near its front end, the shaft 50 is formed with circumferential, axially-spaced grooves 52, in one of which a washer 53 is located (Fig. 7). The washer is formed with an enlarged opening 53' offset from the center of the washer and a relatively narrow slot 53" extending from the opening through the center of the washer. Accordingly, the washer may be mounted on the shaft by inserting the end of the shaft through the enlarged opening 53', sliding the washer along the shaft until it is opposite one of the grooves 52, and then moving the washer radially to engage the sides of the narrow slot 53" in the groove 52. The washer is thus securely located axially on the shaft. At the end of the slot 53", the washer is formed with a forwardly extending, integral key 54 disposed in a keyway 55 in the shaft.

In front of the washer 53 is a dial washer 56 provided with a forwardly extending collar 56' closely surrounding the shaft 50. The washer 56 is also formed with a forwardly extending, integral finger 57 near the top and with a flattened peripheral portion 57' at the bottom (Fig. 7) from which an ear 58 projects. The washer 56 is considerably larger in diameter than washer 53 and is clamped thereto by a pair of screws 59 extending through the washer 56 outside the periphery of washer 53 and threaded into a stop washer 60 (Fig. 6). A rearwardly extending stop 61 on washer 60 co-acts with a lug 61' (Fig. 2) on the boss 26.

A hollow dial 63 is mounted on the dial washer 57 and is secured thereto by a screw 64 extending through a radial opening in the dial and threaded into the finger 57. The ear 58 on the dial washer fits in a recess 58' in the dial, whereby the dial is held securely against rotation relative to the washer. The face of dial 63 is formed with a central opening surrounded by a flange 65, and seated against the inside of the flange is a transparent disk 66 through which the interior of the dial is exposed. The disk 66 is held against flange 65 by a wire ring 67 interposed between the back of the disk and a plurality of lugs 68 on the inside of the dial. As shown in Fig. 9, the face of the dial around the disk 66 is provided with a scale of temperature graduations 69 which extends from the lowest graduation to the highest in a direction opposite to the direction of the thread on rod 46. In the embodiment illustrated, the thread 46' is a right hand thread, and accordingly the scale 69 extends in a counter-clockwise direction from the lowest graduation to the highest. The front face of dial washer 56 (Fig. 8) is provided with a similar scale of graduations, the purpose of which will be described presently.

The temperature in the oven is indicated on the dial 63 by means comprising a generally cylindrical bushing 70 threaded in the bore of hollow shaft 50 and formed with an enlargement 70' which fits against a shoulder in the shaft. An elongated screw 71, made of drill rod, or the like, extends through the bushing 70 and is formed with a square thread or groove 71' normally located in an enlargement of the bore in the bushing. The thread 71' is similar to the thread 46' in that it extends in the same direction or, more particularly, is a righthand thread, and the lead of the thread 71' bears a definite relation to that of thread 46', as will be described presently in greater detail. A spring 72 coiled around the rear end of bushing 70 and screw 71 bears at one end against the enlargement 70' of the bushing and at its opposite end against a shoulder on adjustment nut 48. The spring 72, therefore, urges the bushing and shaft 26 to the left, as seen in Figs. 1 and 2, thereby maintaining the shoulder 50' of the shaft seated against the co-acting shoulder in the casing.

The rear end of screw 71, which is pointed, engages the front end of rod 46, and when the rod is moved to the left upon expansion of chamber 36, the screw 71 is moved to the left through the bushing and is caused to rotate therein by a screw 73 which extends radially through enlargement 70' of the bushing into the square thread 71'. A screw 73' in the bushing, diametrically opposed from the screw 73, may be removed to permit passage of a lubricant into the bushing. When the rod 46 is moved to the right upon contraction of chamber 36, the screw 71 is caused to follow the rod by the action of a spring 74 coiled around the screw in front of bushing 70. The front end of spring 74 extends through a transverse opening 75 in the screw, and the rear end of the spring is seated in a recess 76 in the front end of bushing 70 and has a portion 74' extending radially through the bushing and wound around the base of an annular groove therein. When the screw 71 is moved to the left by rod 46, spring 74 is wound up and is also subjected to tension, so that when the rod 46 moves back to the right, both the tension and the torsion in spring 74 urge the screw to follow the rod. The screw 71 in its return movement is thus caused to rotate in the bushing in a direction opposite to that in which it was rotated by forward movement of rod 46. Mounted on the front end of screw 71 is a metal sleeve 78 which fits tightly over the screw and rotates therewith. A disk 79 is forced over the end of sleeve 78 and is held securely thereon by friction. The front face of disk 79 is provided with an arrow 80 (Fig. 9) which is visible through the transparent disk 66 in the face of the dial.

When the regulator is not in use, the dial 63 may be in its off position shown in Fig. 9, wherein a low temperature or "off" section of the dial is under a fixed index on the range (not shown). In this position of the dial, the stop 61 on washer 60 is in engagement with lug 61' on the casing and prevents rotation of the dial in a counter-clockwise direction. Also, the valve member 29 is seated over gas passage 27, so as to cut off the supply of gas to the oven burner. With the oven at room temperature and the parts in the positions described, the bellows 33 through its connection with rod 46 maintains the screw 71 in such a position that pointer 80 is vertical and points upwardly to the index.

In starting the oven, the dial 63 is turned in a clockwise direction and rotates the shaft 50 through washers 56, 53 and 60. Clockwise rotation of the shaft screws nut 48 to the right on rod 46 and moves the valve member 29 to the right against spring 47, thereby opening the valve. The amount which the valve member is unseated is determined by the temperature to which the dial is set, as indicated on scale 69. That is, if a relatively low temperature is desired, the dial is turned through a small angle so that the nut 48 is screwed only a short distance to the right and the valve member is unseated only a small amount, but if a higher temperature is desired, the dial is rotated through a larger angle to bring one of the higher temperature graduations under the index, thereby screwing the nut 48 a greater distance along rod 46 and unseating the valve a greater amount. It will be observed that the bushing 70 rotates with the dial and shaft 50, so that screw 71 in the bushing and the pointer 80 on the screw turn with the dial. Therefore, when the dial is set with the oven at room temperature, the pointer 80, turning clockwise with the dial, continues to point to the word "off" on the dial regardless of the temperature to which it is set, thus showing the operator that the oven is still at room temperature.

As the temperature in the oven increases, due to opening of the valve, the bellows 33 is contracted and acts through pin 40, strap 42, bimetallic strip 43, rod 46 and spring 47 to move the valve toward its seat. This movement of rod 46 also moves screw 71 to the left against the action of spring 74, whereby the screw is rotated in a counter-clockwise direction, as viewed from the front of the regulator. The pointer 80 is thus rotated in a counterclockwise direction (Fig. 9) toward the lowest graduation on scale 69, and when the oven temperature reaches 250°, the pointer indicates the corresponding temperature on the scale. Assuming, for example, that the dial is set to 400°, so that the graduation "400" is under the index, the pointer 80 gradually moves up the scale as the oven temperature increases and finally assumes its initial vertical position under the fixed index, and also under graduation "400," at which time the oven temperature corresponds to that for which the dial is set. Throughout its movement along the scale, the pointer 80 indicates the actual temperature in the oven at any given time. When the pointer reaches its initial vertical position, indicating that the desired temperature has been reached, the valve member 29 is in its throttling position, wherein it permits the flow of sufficient gas to the burner to maintain the oven at the desired temperature.

If the oven temperature should thereafter continue to increase, the bellows 33 moves rod 46 further to the left and seats the valve, whereupon further contraction of bellows 33 is accommodated by the rod 46 sliding to the left through the opening in valve member 29 and against the spring 47 and by bending of the compensator 43. This additional advance of rod 46 also moves screw 71 further to the left, thereby rotating pointer 80 further along the scale and beyond the index, so that the top of the pointer is at the left side of the index. The pointer thus indicates by its position relative to the index that the oven temperature is too high with respect to the temperature for which the dial is set, and also indicates on the scale the extent to which the oven temperature is too high.

When the oven cools, the bellows 33 expands and spring 47 moves rod 46 to the right through the valve member until nut 48 re-engages the valve member and moves it back to its throttling position. The screw 71, under the action of spring 74, follows rod 46 to the right and is thus rotated in the opposite direction in bushing 70, that is, in a clockwise direction. Clockwise rotation of the screw causes pointer 80 to move down the scale toward its initial vertical position under the index, and when the pointer reaches this position, the operator is informed that the oven temperature has returned to that for which the dial is set. If the oven should cool below the temperature for which the dial is set, the rod 46 is moved further to the right to open the valve wider, and the screw 71 is thereby caused to rotate further in a clockwise direction down the scale so that the top of the pointer moves to the right of the index. The pointer thus indicates by its position relative to the index that the oven temperature is too low with respect to the dial setting, and indicates on the scale the extent to which the temperature is too low.

In setting the dial from a high temperature to a lower one, it is rotated in a counter-clockwise direction and turns the pointer with it, so that the pointer continues to point to the graduation on scale 69 corresponding to the oven temperature. The top of the pointer is thus moved to the left of the index and indicates that the temperature of the oven is too high. Assuming that the dial is now set for 250°, as the oven cools to that temperature, the bellows 33 moves rod 46 to the right, whereby screw 71 is caused to rotate in a clockwise direction and move the pointer down the scale toward its initial vertical position under the index. When the oven temperature reaches 250°, the pointer is under the fixed index and points to the graduation "250" on the scale.

It will be observed that the pointer 80 of the new regulator performs two functions. That is, it shows by its position relative to the index whether the oven is too hot or too cold with respect to the temperature for which the dial is set, and it shows on the scale of the dial the actual temperature in the oven. Adjustment of the dial rotates screw 71 against the end of rod 46, thereby causing the pointer to follow the movement of the dial and scale without affecting the connection of the pointer to the bellows, and accordingly the dial adjustment does not affect the indication of oven temperatures on the scale. Also, adjustment of the dial has no affect on the indication of the relation between the oven temperature and that for which the dial is set, because when the dial is set to a new temperature, the top of the pointer moves to one side or the other of the index, depending on whether the new temperature is higher or lower than the oven temperature.

In setting the dial to a given higher temperature, the valve member is moved away from its seat a distance proportional to the amount which the dial and pointer are rotated, but when the oven is heated to the new temperature, the valve member does not return to its seat but assumes a throttling position spaced a slight distance from the seat. This shorter return movement effected by rod 46 should rotate the pointer 80 back through the same angle through which it was rotated by the dial in setting the valve member, and to this end the lead of square thread 71' is made somewhat less than that of the thread 46' on rod 46. The difference in the leads of these threads is determined by the spacing of the valve member from its seat when the valve is throttling. In most instances, the valve member in its throttling position is spaced only a slight distance from its seat, and accordingly the lead of thread 46' will be only slightly greater than that of thread 71'. While the leads of the threads 46' and 71' are only slightly different, their helix angles differ greatly due to the fact that the diameter of the threaded portion 46' is substantially greater than that of screw 71. The diameter of the threaded portion of rod 46 is so proportioned that the helix angle of the thread 46' is less than the angle of rest, that is, the critical angle upon which an endwise thrust of rod 46 relative to nut 48 would cause relative rotation of the nut and rod, and the diameter of screw 71 is such that the helix angle of thread 71' is greater than the angle of rest.

The regulator may be readily calibrated by removing the dial from washer 56 and unloosing the screws 59 which clamp washers 56 and 60 to the key washer 53. The washers 56 and 60 may then be rotated on shaft 50 to effect the desired calibration, the scale 69' on the washer 56 serving as a guide in the calibrating operation. In the adjustment of dial washer 56 on the shaft, the stop washer 60 is moved with the dial washer by the screws 59, so that the stop 61 for the dial is held in a fixed relation to the temperature graduations while the position of the graduations is varied relative to the shaft. Accordingly, the stop 61 will engage lug 61' on the casing when the dial is in its "off" position, regardless of the calibration of the instrument. It will be apparent that the axial position of the dial on shaft 50 may be varied by removing the dial and washers 56 and 60 from key washer 53, moving the key washer into a different groove 52 in the shaft, and then reassembling the parts.

In some installations, the regulator may be mounted on the range near an open burner which might heat and expand the liquid in chamber 36. Such expansion of the liquid would cause a false actuation of the valve, unless suitable provision were made to correct for the action of the external heat. In the new regulator, when the liquid in chamber 36 expands due to external heat, thereby urging rod 46 to the left, the bi-metallic strip 43 bows so that the intermediate portion thereof moves to the right. The retainer 45 urges the head of rod 46 against strip 43, whereby the rod follows the intermediate portion of the strip to the right and compensates for the liquid expansion in chamber 36. When the external heat source permits the liquid in chamber 36 to cool, causing rod 46 to move to the right, the compensating strip 43 bows in the opposite direction so as to force the head of pin 46 to the left an equal amount. The corrugations 43' prevent bowing of the compensator in a direction transverse to its length but do not effect longitudinal bowing thereof, and longitudinal bowing of the compensator is therefore unretarded. Accordingly, the compensator may be made relatively small and will still perform the same amount of work as larger compensators of this type as made heretofore.

It will be apparent that by reason of the double valve seat 28—28' of the new valve, the fit between rod 46 and valve member 29 may be relatively loose, because when the valve member is seated it closes the gas passage 27 in the valve seat from the central opening in the valve member. By removing the body 21 of the casing from section 20, access may be had to the valve mechanism, whereby the strap 42, compensator 43, retainer 45, rod 46, adjustment nut 48 and valve member 29 may be removed as a unit to facilitate cleaning thereof. The operating shaft 50 may also be removed by detaching the dial and washers and the indicating disk 79 and withdrawing the shaft from the passage 25 in section 20. The actuating means for indicator 80 may then be removed from the shaft and cleaned or adjusted.

If desired, the oven may be provided with a pilot (not shown) supplied with gas by a pipe 82 threaded in one side of section 20 and communicating through a transverse passage 83 with gas passage 27. The supply of gas from passage 27 to the pilot may be adjusted by a screw 84 extending transversely through the passage 83, that is, lengthwise of the casing. The screw 84 is provided with shoulders 85 and 85' at opposite ends of the threaded portion thereof, and these shoulders coact with shoulders in the casing and form grease or packing chambers acting as a double seal. The flow of gas through by-pass 86 may be regulated by an adjustment screw 87 similar to screw 84.

The regulator shown in Fig. 12 is adapted for use on electric ranges and comprises a casing made up of a front section 90 and a rear section 91 connected together by bolts 92. A cup 93 is mounted on the back of the casing with its open end toward the casing, and a metal bellows 94 sealed within the cup forms a space 95 between the cup and bellows constituting an expansible and contractible chamber. The open end of cup 93 is sealed to the casing by an annulus 96 disposed between the casing and a flange 93' on the cup, the cup and annulus being held tightly against the casing by bolts 97. A capillary tube 98 communicates with chamber 95 and is sealed at one end in an opening in cup 93. The tube 98 extends to a bulb (not shown) which is adapted to be located in the oven, and the bulb, tube and chamber are filled with a thermo-responsive liquid.

A headed pin 99 is disposed in bellows 94 with its head seated against the end of the bellows, the shank of the pin extending forwardly into a sleeve 99' in which the pin is slidable. The rear end of the sleeve is formed with a head normally engaging the head of pin 99, while the front portion of the sleeve is slotted transversely, as shown at 99''. The sleeve 99' extends forwardly through the annulus 96 and an opening in the back of the casing, the annulus being formed with integral keys 96' which extend into the slot 99' in the sleeve, thereby securing the sleeve against rotation while permitting axial movement thereof. A spring 100 coiled around pin 99 bears at one end against the annulus 96 and at the opposite end against the head of the sleeve 99'. Threaded into the front end of sleeve 99' is a rod 101 which extends forwardly in the casing through an opening in a bar or lever 102 mounted on a pivot pin 103 secured to the rear section 91. In front of the lever 102, the rod has a shoulder 104 which engages lugs 102' formed on the lever on opposite sides of the opening through which the rod extends. The lever 102 is connected to a snap-acting mechanism (not shown) which may take various forms but is preferably of the form disclosed in my co-pending application Serial No. 180,710, filed December 20, 1937. The snap-acting mechanism is adapted to actuate a member 105 in the casing and thereby open and close a switch (not shown). When the chamber 95 contracts sufficiently, it moves rod 101 and lever 102 to the right and causes the snap-acting mechanism to close the switch. The snap-acting mechanism is self-restoring so that when the chamber 95 expands and moves the shoulder on rod 101 away from lever 102, the switch is opened.

The rod 101 is provided with an enlarged hollow portion 106 in front of shoulder 104, and the front end of the rod is formed with a pair of radial, diametrically opposed lugs 107 which fit into a yoke 108' at the rear end of a shaft 108.

The shaft 108 is rotatable in a bushing 109 mounted in a hollow boss 110 forming the front of section 90 of the casing. A shoulder 111 on the shaft engages the rear end of bushing 109 and thereby locates the axial position of the shaft in the casing. At the front of shaft 108 is a dial 63a similar to the dial 63 and mounted on the shaft by a washer assembly similar to that illustrated in Fig. 1, except for the stop washer 60a. The latter washer is formed with a lug 61a which engages a stop 112 on the boss 110 when the dial is in its "off" position. The stop 112 also serves to secure a washer 113 which closely surrounds the shaft and is disposed between the end of boss 110 and a shoulder 114 on the shaft, whereby the shaft is held against rearward movement in the casing.

A cam 115 on washer 60a co-acts with a headed pin 116 extending through boss 110 and slidable therein. The head on pin 116 is located in a recess 117 formed on the inside of section 90 and normally engages one end of a leaf spring 118 which is doubled back and secured at the opposite end to the casing. The body of spring 118 normally engages the switch member 105, and when the dial is in its "off" position, the cam 115 through pin 116 and spring 118 holds the member 105 away from the switch contacts, whereby the snap-acting mechanism cannot close the switch. However, when the dial is turned from its "off" position, the pin 116 rides down the face of cam 115 under the action of spring 118, so that the switch member 105 is released and may be actuated by the snap-acting mechanism.

The temperature in the oven is indicated by means comprising a pin 120 extending through a central bore in rod 101 and seated at its rear end against the end of pin 99. A cylindrical bushing 70a fits closely in a central bore in shaft 108 and is held against rotation therein by lugs 121 on the bushing which extend into the yoke 108' on the shaft. A screw 71a extends through bushing 70a and engages the front end of pin 120. The screw 71a is formed with a square thread or groove similar to the thread 71' (Fig. 11), and a screw 73a in the bushing extends into the square thread. A spring 74a coiled around the screw 71a is secured at its front end to the screw and is seated at its rear end in a recess in the front end of bushing 70a and secured to the bushing in any suitable manner. A sleeve 78a is mounted on the front end of screw 71a and has a disk 79a secured thereto, the disk being rotatable with the screw. The front face of disk 79a is provided with a pointer (not shown) similar to the pointer 80 shown in Fig. 9.

The heating coil in the oven is connected through wiring 122 and terminals 123 to the switch contacts in the casing. When the oven is not in use, the dial is in its "off" position wherein the switch is held open, and the pointer on disk 79a is held in a vertical position by the bellows through pin 120 and screw 71a. The pointer thus points upwardly to a fixed index on the range (not shown), with reference to which the dial is adjusted. When the oven is to be heated, the dial is rotated in a clockwise direction until the graduation thereon corresponding to the desired oven temperature is under the index. In this operation, the rod 101 is screwed inwardly in pin 99 and moves lever 102 to the right so as to actuate the snap-acting mechanism and close the switch. Adjustment of the dial also rotates bushing 70a and screw 71a and causes the pointer on disk 79a to turn with the dial, so that the pointer continues to point to the word "off" on the dial.

As the oven commences to heat, the chamber 95 expands and moves rod 101 to the left, thereby permitting the snap-acting mechanism to move lever 102 to the left toward its critical or dead-center position. This movement of rod 101 also urges screw 71a to the left in bushing 70a against the action of spring 74a, so that the screw is rotated in a counter-clockwise direction by the action of the element 73a in the screw thread. The pointer on indicator disk 79a is thus moved in a counter-clockwise direction up the scale on dial 63a, until it arrives at its initial vertical position under the fixed index and points to the temperature on the scale for which the dial is set. Simultaneously, the lever 102 is moved through its dead-center position and causes the snap-acting mechanism to actuate member 105 and re-open the switch. If the oven temperature should continue to increase, screw 71a is rotated further in a counter-clockwise direction, so that the top of the pointer moves to the left of the fixed index. When the oven cools, chamber 95 contracts and moves rod 101 to the right, whereupon spring 74a urges screw 71a to the right and thereby rotates it in a clockwise direction, so that the pointer on disk 79a moves back toward its initial vertical position under the index. Thereafter, adjustment of the dial to either a higher or a lower temperature setting does not affect the indication of the oven temperature on the scale, because the pointer on disk 79a moves with the dial without affecting the connection between bellows 94 and the pointer.

In the construction shown in Fig. 12, adjustment of the dial to a higher temperature setting moves rod 101 to the right an amount determined by the angle through which the dial and disk 79a are rotated, and when the oven is heated to the new temperature, the rod 101 is moved back to its initial position by bellows 94. Accordingly, in order that this return movement of rod 101 may turn the indicator disk 79a back through the same angle through which it was turned by the dial, the lead of the thread in screw 71a should be the same as that of the thread on rod 101. Otherwise, these threads are the same as the threads 71' and 46', respectively, shown in Fig. 1.

I claim:

1. In a regulator for controlling the temperature in an appliance, a handle movable to different temperature settings for adjusting the regulator, a scale of temperature graduations connected to the handle and movable with the handle for indicating different temperature settings thereof, a temperature indicator, a thermo-responsive element, a connection between the thermo-responsive element and said indicator for moving the indicator relative to the scale to indicate temperatures on the scale, and an operative connection between the handle and said temperature indicator independent of said first connection and operable to move the indicator with the scale while the thermo-responsive element is stationary.

2. In a temperature regulator, thermo-responsive control means, adjusting means movable to different temperature settings for adjusting the control means, a scale of temperature graduations movable with the adjusting means, a pointer cooperating with the scale, a thermo-responsive element for actuating the control means, a connection between the pointer and said element including a pair of normally engaged, relatively movable members, and a connection between the adjusting means and pointer including the part of said first connection between one of said relatively movable members and the pointer, said last connection being operable to move the pointer with the adjusting means and scale while maintaining said members in engagement.

3. In a temperature regulator, a handle movable to different temperature settings for adjusting the regulator, a temperature indicating means including an indicator near the handle, a thermo-responsive element for moving the indicating means, a scale of temperature graduations movable with the handle for indicating different temperature settings thereof and with reference to which the indicator is moved to indicate temperatures on the scale, and coaxial, independent connections between the handle and the indicating means and between the thermo-responsive element and the indicating means, respectively, the connection between the handle and the indicating means being operable to move said indicating means with the scale while the thermo-responsive element is stationary.

4. A temperature regulator comprising control means, adjusting means movable to different temperature settings for adjusting the control means, a scale of temperature graduations for indicating different settings of the adjusting means, an indicator cooperating with the scale, a thermo-responsive element for actuating the control means, a member rotatable clockwise by movement of said element in one direction and counter-clockwise by movement of said element in the opposite direction, means connected to said member for relatively moving the scale and indicator, and a connection between the adjusting means and said member for rotating the member and indicator independently of the thermo-responsive element and while the thermo-responsive element is stationary.

5. A temperature regulator comprising control means, adjusting means movable to different temperature settings for adjusting the control means, a scale of temperature graduations for indicating different settings of the adjusting means, an indicator cooperating with the scale, a bushing, a member movable axially in the bushing for relatively moving the scale and indicator, means for rotating the member clockwise in the bushing in response to axial movement thereof in one direction and counter-clockwise in response to axial movement thereof in the opposite direction, thermo-responsive means for actuating the control means and engaging one end of said member to move the member axially, and a connection from the adjusting means through the bushing to said member for rotating the member against the adjacent end of the thermo-responsive means.

6. A temperature regulator comprising control means, adjusting means movable to different temperature settings for adjusting the control means, a scale of temperature graduations for indicating different settings of the adjusting means, an indicator cooperating with the scale, a bushing, a member in the bushing having a helical thread, an element in the bushing engaged in said thread, thermo-responsive means for actuating said control means and engaging one end of said member for moving the same axially in the bushing to rotate the member, means operable by said member for relatively moving the scale and indicator, and a connection from the adjusting means through the bushing to said member for rotating the member independently of the thermo-responsive means.

7. A temperature regulator comprising control means, a hollow shaft rotatable to different temperature settings for adjusting the control means, a scale of temperature graduations for indicating different settings of the shaft, an indicator cooperating with the scale, a member in the shaft rotatable therewith and movable axially therein, a threaded connection between said member and the shaft for causing the member to rotate upon axial movement thereof in the shaft, thermo-responsive means for actuating said control means and engaging one end of said member for moving the same axially in the shaft, and means operable by said member for relatively moving the scale and indicator.

8. A temperature regulator comprising a control member, a thermo-responsive element extending through the control member for actuating the same, means threaded on one end of said element for adjusting the control member, a hollow shaft rotatable to adjust said means, a member in the shaft rotatable therewith and movable axially therein, one end of the rotatable member engaging the threaded end of the thermo-responsive element and movable axially thereby, means for rotating said last member upon axial movement thereof in the shaft, and temperature indicating means operable by said rotatable member.

9. A temperature regulator comprising a control member, a thermo-responsive element extending through the control member for actuating the same, a nut threaded on one end of said element for adjusting the control member, a hollow shaft having a shoulder therein and rotatable to adjust said nut, a bushing in the shaft having a shoulder normally engaging said shoulder in the shaft, a member in the bushing rotatable therewith and movable axially therein, one end of said last member engaging the threaded end of the thermo-responsive element and movable axially thereby, means for rotating said member upon axial movement thereof in the bushing, and temperature indicating means operable by said rotatable member.

10. A temperature regulator comprising a valve and a seat therefor, a thermo-responsive element for actuating the valve, a nut threaded on one end of said element for adjusting the valve, a handle for adjusting the nut to move the valve away from its seat, a rotatable member engaging the threaded end of the thermo-responsive element and movable axially thereby, threaded means for causing said member to rotate upon axial movement of the member, and temperature indicating means rotatable by said member relative to the handle and rotatable with the handle independently of the thermo-responsive element, the lead of the thread of said threaded means being less than the lead of the thread on the adjustment nut whereby the indicating means is rotated with the handle through a selected angle in one direction on movement of the handle to unseat the valve and is rotated by said member through the same angle in the opposite direction upon return movement of the valve by the thermo-responsive element to a throttling position spaced from said seat.

11. A temperature regulator comprising a valve and a seat therefor, a thermo-responsive element for actuating the valve, a nut threaded on one end of said element for adjusting the valve, a handle for adjusting the nut to move the valve away from its seat, a rotatable member engaging the threaded end of the thermo-responsive element and movable axially thereby, threaded means for causing said member to rotate upon axial movement of the member, and temperature indicating means rotatable by said member relative to the handle and rotatable with the handle independently of the thermo-responsive element, the helix angle of the thread of said threaded means being greater than the angle of rest and the helix angle of the thread on said adjustment nut being less than the angle of rest, whereby the nut is prevented from rotating under the thrust of the thermo-responsive element but said member is rotated under the action of said thrust.

12. A temperature regulator comprising a control element movable between operative and inoperative positions, thermo-responsive means for moving said element, a temperature adjustment handle, a threaded connection between the handle and said control element for adjusting the position thereof, a rotatable member engaging the thermo-responsive means and movable axially thereby, threaded means for causing said member to rotate relative to the handle upon axial movement of the member, and temperature indicating means rotatable by said member relative to the handle and rotatable with the handle independently of said thermo-responsive means, the lead of the thread from said connection being substantially equal to the lead of the thread of said threaded means whereby the indicating means is rotated with the handle through a selected angle in one direction on rotation of the handle to move said element to its operative position and is rotated by said member through the same angle in the opposite direction upon operation of said thermo-responsive means to return the control element to its inoperative position.

13. In a temperature regulator and indicator, a control means, temperature indicating means, a thermo-responsive member for actuating the control means and operating the indicating means, an adjustment member operable to move the control means to different temperature settings, and a pivotal connection between the thermo-responsive member and said indicating means including an element disposed within the adjustment member and movable axially therein for transmitting movement of the thermo-responsive member to the indicating means.

14. In a temperature regulator, a thermo-responsive element movable linearly, control means actuated thereby, an operating shaft for adjusting the control means to different temperature settings, a temperature indicator in front of the shaft, and means extending through the shaft for translating linear movement of the thermo-responsive element to rotary movement of said indicator.

15. In a temperature regulator, a thermo-responsive element movable linearly, control means actuated thereby, an adjustable connection between the thermo-responsive element and said control means, manually operable means for adjusting said connection to different temperature settings, a temperature indicator, and threaded means extending through said manual means for translating linear movement of the thermoresponsive element to rotary movement of said indicator.

16. A temperature regulator comprising a valve, a thermo-responsive element for actuating the valve, a nut threaded on one end of said element for adjusting the valve, means for adjusting said nut to move the valve to different temperature settings, a rotatable member engaging the threaded end of the thermo-responsive element and movable axially thereby, a threaded connection between said rotatable member and the adjusting means for causing the member to rotate relative to the adjusting means upon axial movement of said member, and temperature indicating means operable by said member and movable with the adjusting means while the thermo-responsive element is stationary.

BENSON F. WADDELL.